(12) United States Patent
Kline et al.

(10) Patent No.: US 8,166,014 B2
(45) Date of Patent: Apr. 24, 2012

(54) DETECTION OF IMPROPER SEARCH QUERIES IN A WIDE AREA NETWORK SEARCH ENGINE

(75) Inventors: Scott B. Kline, Marina del Rey, CA (US); Jody D. Biggs, La Crescenta, CA (US)

(73) Assignee: Yahoo! Inc., Sunnyvale, CA (US)

( * ) Notice: Subject to any disclaimer, the term of this patent is extended or adjusted under 35 U.S.C. 154(b) by 2014 days.

(21) Appl. No.: 10/429,209

(22) Filed: May 2, 2003

(65) Prior Publication Data

US 2004/0220915 A1 Nov. 4, 2004

(51) Int. Cl.
*G06F 17/30* (2006.01)
(52) U.S. Cl. .................. 707/706; 707/709; 707/722
(58) Field of Classification Search .............. 707/10, 707/706, 709, 722
See application file for complete search history.

(56) References Cited

U.S. PATENT DOCUMENTS

| | | | | |
|---|---|---|---|---|
| 6,393,423 | B1 * | 5/2002 | Goedken ..................... | 707/10 |
| 6,421,675 | B1 * | 7/2002 | Ryan et al. ................... | 707/100 |
| 6,442,606 | B1 * | 8/2002 | Subbaroyan et al. ......... | 709/224 |
| 6,484,155 | B1 | 11/2002 | Kiss et al. | |
| 6,804,675 | B1 * | 10/2004 | Knight et al. ................ | 707/10 |
| 7,013,303 | B2 * | 3/2006 | Faybishenko et al. ........ | 707/10 |
| 2003/0135490 | A1 * | 7/2003 | Barrett et al. ................ | 707/3 |

OTHER PUBLICATIONS

Article entitled "BaffleText: a Human interactive Proof" by Chew et al. published on Jan. 23, 2003.*
Article entitled "Google protects its search results" by Mariano published on Aug. 18, 2002.*
Article entitled "Meet the Search engines, Search Engine Strategies 2001 Conference" by Nobles published on Aug. 17, 2001.*
(Article entitled "Google protects its search results", by Mariano, dated Aug. 18, 2002).*
(Article entitled "BaffleText: a Human interactive Proof" by Chew et al. published on Jan. 23, 2003).*
(Article entitled "Meet the Search engines, Search Engine Strategies 2001 Conference" by Nobles published on Aug. 17, 2001).*
(Article entitled "Google Terms of Service" by Google published on Feb. 23, 2002).*
Matevz Poganik and Jurij F. Tasic. "Agent Based Retrieval of Information From Internet." copyright 2000.
Sabine Kebreau, Samuel Pierre, and Wilfred Probst. An Intelligent Information-filtering Assistant Integrated Into a Multi-Agent Architecture, 1999.
Torsten Illman, Frank Kargl, and Michael Weber. Design of an Agent Cluster as Integrative Environment of Personal Agents, 1999.

* cited by examiner

*Primary Examiner* — Mahesh Dwivedi
(74) *Attorney, Agent, or Firm* — Brinks Hofer Gilson & Lione (57) ABSTRACT

Search queries which are used to assess performance of search listings are filtered such that the remaining search queries more accurately represent behavior of human users genuinely looking for information in a search engine. Search queries which come from unrecognized user agents or which come from the same network address too closely together or too regularly are removed. If a volume of search queries for a given search term in a period of time exceeds an expected volume, search queries for that term are discarded.

10 Claims, 11 Drawing Sheets

DETECTION OF IMPROPER SEARCH QUERIES IN A WIDE AREA NETWORK SEARCH ENGINE

FIELD OF THE INVENTION

This invention relates to the field of analysis of search queries, and more specifically to a mechanism for automatically filtering out inappropriate search queries submitted to a wide area network search engine to thereby improve performance and analysis of the search engine.

BACKGROUND OF THE INVENTION

The Internet is a wide area network having a truly global reach, interconnecting computers all over the world. That portion of the Internet generally known as the World Wide Web is a collection of inter-related data whose magnitude is truly staggering. The content of the World Wide Web (sometimes referred to as "the Web") includes, among other things, documents of the known HTML (Hyper-Text Mark-up Language) format which are transported through the Internet according to the known protocol, HTTP (Hyper-Text Transport Protocol).

The breadth and depth of the content of the Web is amazing and overwhelming to anyone hoping to find specific information therein. Accordingly, an extremely important component of the Web is a search engine. As used herein, a search engine is an interactive system for locating content relevant to one or more user-specified search terms, which collectively represent a search query. Through the known Common Gateway Interface (CGI), the Web can include content which is interactive, i.e., which is responsive to data specified by a human user of a computer connected to the Web. A search engine receives a search query of one or more search terms from the user and presents to the user a list of one or more references to documents which are determined to be relevant to the search query.

Search engines dramatically improve the efficiency with which users can locate desired information on the Web. As a result, search engines are one of the most commonly used resources of the Internet. An effective search engine can help a user locate very specific information within the billions of documents currently represented within the Web. The critical function and raison d'être of search engines is to identify the few most relevant results among the billions of available documents given a few search terms of a user's query and to do so in as little time as possible.

Generally, search engines maintain a database of records associating search terms with information resources on the Web. Search engines acquire information about the contents of the Web primarily in several common ways. The most common is generally known as crawling the Web and the second is by submission of such information by a provider of such information or by third-parties (i.e., neither a provider of the information nor the provider of the search engine). Another common way for search engines to acquire information about the content of the Web is for human editors to create indices of information based on their review.

To understand crawling, one must first understand that HTML documents can include references, commonly referred to as links, to other information. Anyone who has "clicked on" a portion of a document to cause display of a referenced document has activated such a link. Crawling the Web generally refers to an automated process by which documents referenced by one document are retrieved and analyzed and documents referred to by those documents are retrieved and analyzed and the retrieval and analysis are repeated recursively. Thus, an attempt is made to automatically traverse the entirety of the Web to catalog the entirety of the contents of the Web.

Since documents of the Web are constantly being added and/or modified and also because of the sheer immensity of the Web, no Web crawler has successfully cataloged the entirety of the Web. Accordingly, providers of Web content who wish to have their content included in search engine databases directly submit their content to providers of search engines. Other providers of content and/or services available through the Internet contract with operators of search engines to have their content regularly crawled and updated such that search results include current information. Some search engines, such as the search engine provided by Overture, Inc. of Pasadena, Calif. (http://www.overture.com) and described in U.S. Pat. No. 6,269,361 which is incorporated herein by reference, allow providers of Internet content and/or services to compose and submit brief title and descriptions to be associated with their content and/or services. Such a title, description, and an address to associated information are collectively referred to as a search listing. Search listings are typically returned as individual results corresponding to a received and processed search query. As the Internet has grown and commercial activity conducted through the Internet has also grown, some search engines have specialized in providing commercial search results presented separately from informational results with the added benefit of facilitating commercial transactions over the Internet.

Information regarding activity of a search engine is gathered for various purposes. Such purposes include both public and private purposes. As an example of a private purpose, a search engine provider can collect information on searching activity for evaluating such things as server resource requirements and public response to various aspects of search services provided. As an example of public purposes, a search engine provider may intend to publish information regarding numbers of searches performed in total, for various time periods, and for various search terms. Whether for internal auditing and evaluation of search engine performance or for external advertising of search engine popularity or for another purpose altogether, the accuracy of such collected information is paramount.

However, such information is generally intended to represent searching activity of human users in a genuine attempt to locate specific information held by the search engine. Search queries are frequently submitted for reasons other than a genuine attempt to locate information. For example, a provider of information might periodically search that information to see how such information is presented by a search engine. Sometimes, one or more parties might be interested in measuring immediacy of response of one or more search engines by submitting a number of search queries and timing the delay between submission and receipt of results. In addition, some parties might attempt to make a search listing appear more popular than it is by configuring a program to periodically submit search queries crafted to give such an appearance. All of these instances, and any others in which search queries are submitted for purposes other than location of information of interest, influence information of search engine activity to the extent any such information is intended to be representative of human searcher activity.

What is needed is a mechanism by which searching activity which is not the result of a genuine search for information a human user can be identified such that accuracy of information gathered pertaining to the activities of human searches is dramatically improved.

SUMMARY OF THE INVENTION

In accordance with the present invention, records of illegitimate searches are detected and removed such that information gleaned from recorded search activity does not reflect illegitimate searching activity. An illegitimate search is one which is submitted either automatically, i.e., not by a human user, or by a human user for purposes other than a genuine attempt to locate information served by the search engine. Examples of illegitimate searches include searches submitted to determine immediacy of response by the search engine, searches submitted to determine specific location of specific search listings in results sets, and searches submitted primarily to influence search activity data collected with respect to the search engine.

Search records are filtered both by analysis of individual searches, individually and in relation to other searches, and by analysis of the overall volume of searches.

In analysis of individual searches, user agents—the programs used to submit individual search queries—are compared to predetermined user agents which are recognized as legitimate. If a search query is submitted by an automated script or a program which is configured to automatically submit search queries, the search query is not considered a genuine attempt by a user to locate information from the search engine and is therefore discarded so as to not influence activity reports of the search engine.

Timing of search queries relative to other search queries submitted from the same network address (e.g., Internet Protocol—IP—address) is analyzed to detect behavior which is not likely that of a human user in a genuine attempt to locate information. Specifically, search queries which follow too closely behind other search queries, e.g., within less than two seconds, are considered too quickly submitted to be submitted by a human user. In addition, search queries which are submitted at time intervals which are too regular are considered unlikely to be the result of a genuine attempt by a human user to locate information through the search engine. To determine the regularity of the time intervals between search queries, the time intervals are collected and the standard deviation of those time intervals is compared to a predetermined minimum threshold, e.g., two seconds. For example, if numerous search queries are submitted roughly 60 seconds apart from one another and the standard deviation from the 60-second average is less than one second, those search queries are presumed to be submitted by an automated process and not by a human user. Accordingly, such search queries are removed from the data stream of search queries so that the data stream more accurately represents legitimate searching activity.

In analysis of search query volume, statistical analysis is performed to detect anomalous search activity and to thereby identify search activity which unlikely to be genuine attempts by human users to locate information. An example of such statistical analysis involves searches arriving through multiple channels of the Internet, e.g., from multiple affiliate servers which forward search requests to a given search engine. While search activity is not particularly predictable, relative proportions of search activity distributed among multiple channels tends to remain fairly stable and predictable.

To detect such anomalies, search queries for a given term are accumulated into 15-minute aggregated search records which represent a volume of search queries for the term in a 15-minute period. Similar aggregation is performed for 24-hour periods as well. Each aggregated search record is compared to an expected volume of search queries for the term in the same period of time. The expected volume is based on the relative volumes among respective paths through the Internet. If the aggregated search volume is significantly greater than the expected volume, the amount by which the aggregated search volume exceeds the expected volume is noted and that amount of search queries—less any search queries which are individually determined to be illegitimate—are removed from the data stream of search queries to be used for search listing performance assessment.

Expected volumes of search queries for each term are determined according to the volume of filtered search queries which are allowed to pass through to search listing performance assessment in a current, comparable period of time.

DETAILED DESCRIPTION

In accordance with the present invention, search requests which are not legitimate attempts by users to locate information on a computer network are detected and removed from search data. Thus, any use of the search data for accounting or search engine activity assessment is not inappropriately influenced by such illegitimate searches. Illegitimate searches include searches which are used to test response time of search engine 102 (FIG. 1), searches which are used to test placement of specific search listings within sets of search results, and searches which are intended to influence search activity analysis. Such searches should not influence any information intended to represent bona fide attempts of users to locate information within the Web.

Figure 1:
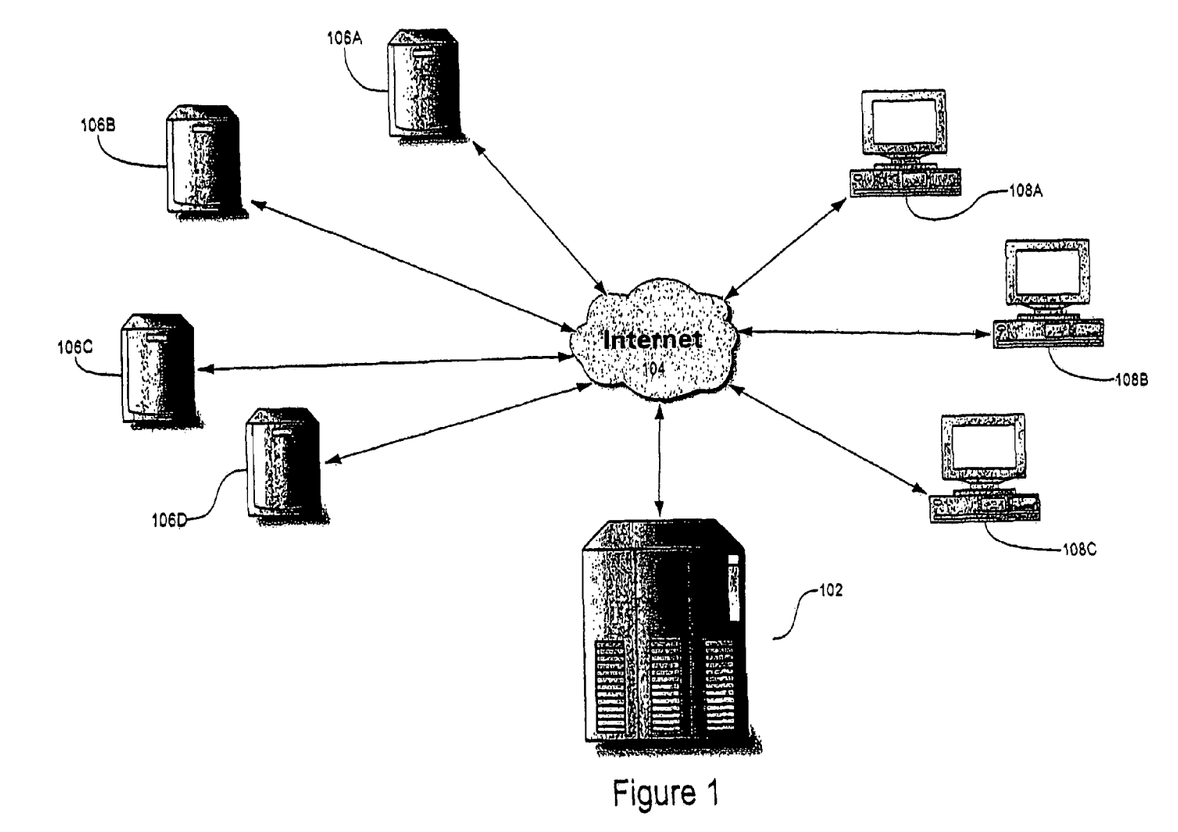
FIG. 1 is a block diagram showing host computers, client computers, and a search engine according to the present invention coupled to one another the a wide area network.

FIG. 1 shows a search engine 102 which is coupled to, and serves, a wide area network 104—which is the Internet in this illustrative embodiment. A number of host computer systems 106A-D are coupled to Internet 104 and provide content to a number of client computer systems 108A-C which retrieve and display such content, e.g., for human users. Of course, FIG. 1 is greatly simplified for illustration purposes. For example, while only four (4) host computer systems and three (3) client computer systems are shown, it should be appreciated that (i) host computer systems and client computer systems coupled to the Internet collectively number in the millions of computer systems and (ii) host computer systems can retrieve information like a client computer system and client computer systems can host information like a host computer system.

Search engine 102 is a computer system which catalogs information hosted by host computer systems 106A-D and serves search requests of client computer systems 108A-C for information which may be hosted by any of host computers 106A-D. In response to such requests, search engine 102 produces a report of any cataloged information which matches one or more search terms specified in the search request. Such information, as hosted by host computer systems 106A-D, includes information in the form of what are commonly referred to as web sites. Such information is retrieved through the known and widely used hypertext transport protocol (HTTP) in a portion of the Internet widely known as the World Wide Web. A single multimedia document presented to a user is generally referred to as a web page and inter-related web pages under the control of a single person, group, or organization is generally referred to as a web site. While searching for pertinent web pages and web sites is described herein, it should be appreciated that some of the techniques described herein are equally applicable to search for information in other forms stored in a computer network.

Figure 2:
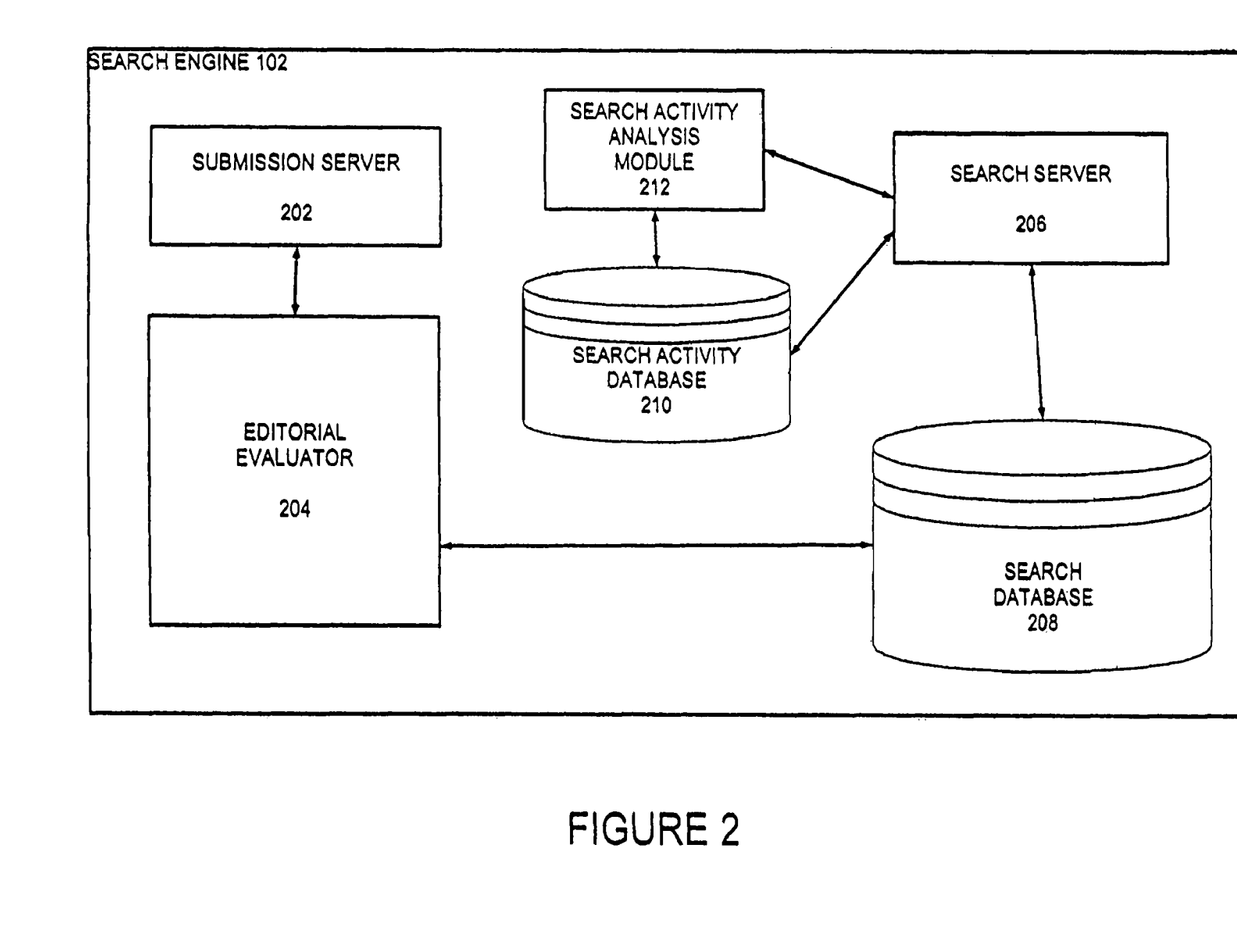
FIG. 2 is a block diagram showing the search engine in greater detail.

Search engine 102 is shown in greater detail in FIG. 2. Search engine 102 includes a search server 206 which receives and serves search requests from any of client computer systems 108A-C using a search database 208. In addition, search engine 102 can receive and serve search queries on behalf of one or more other search engines. Such other search engines are sometimes referred to as sources.

Search engine 102 also includes a submission server 202 for receiving search listing submissions from any of host computers 108A-D. Each submission requests that information hosted by any of host computers 108A-D be cataloged within search database 208 and therefore available as search results through search server 206.

To avoid providing unwanted search results to client computer systems 108A-C, search engine 102 includes an editorial evaluator 204 which evaluates submitted search listings prior to inclusion of such search listings in search database 208.

In this illustrative embodiment, search engine 102—and each of submission server 202, editorial evaluator 204, and search server 206—is all or part of one or more computer processes executing in one or more computers. Briefly, submission server 202 receives requests to list information within search database 208, and editorial evaluator 204 filters submitted search listings prior to including them in search database 208. The process by which such search listings are filtered is described more completely in U.S. patent application Ser. No. 10/244,051 filed Sep. 13, 2002 by Dominic Cheung et al. and entitled "Automated Processing of Appropriateness Determination of Content for Search Listings in Wide Area Network Searches" and that description is incorporated herein by reference for any and all purposes.

Search engine 102 also includes a search activity database 210 which includes data representing search activity by human users in genuine attempts to locate information. In addition, search engine 102 includes a search activity analysis module 212 for analyzing search activity processed by search engine 102. Search activity analysis module 212 is also all or part of one or more computer processes executing in one or more computers.

Figure 3:
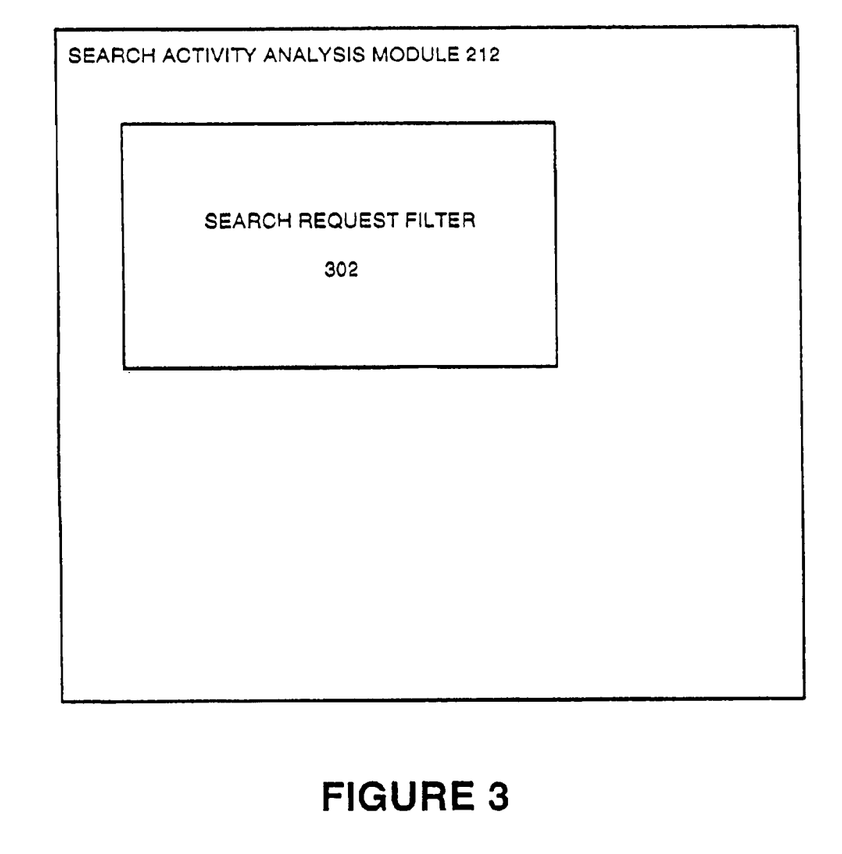
FIG. 3 is a block diagram showing a search activity analysis module of the search engine of FIG. 2 in greater detail.

As used herein, a search includes a search request which includes (i) one or more search terms which are collectively referred to as a search query and (ii) a set of one or more search listings returned in response to the search query as search results. Of course, it is possible that no search listings relevant to the search query are found and that the set of search results returned in response to the query include no search listings. In general, search requests are represented in search activity database 210 (FIG. 2) as described above. Search activity analysis module 212 includes a search request filter 302 which removes data representing illegitimate search requests.

Figure 4:
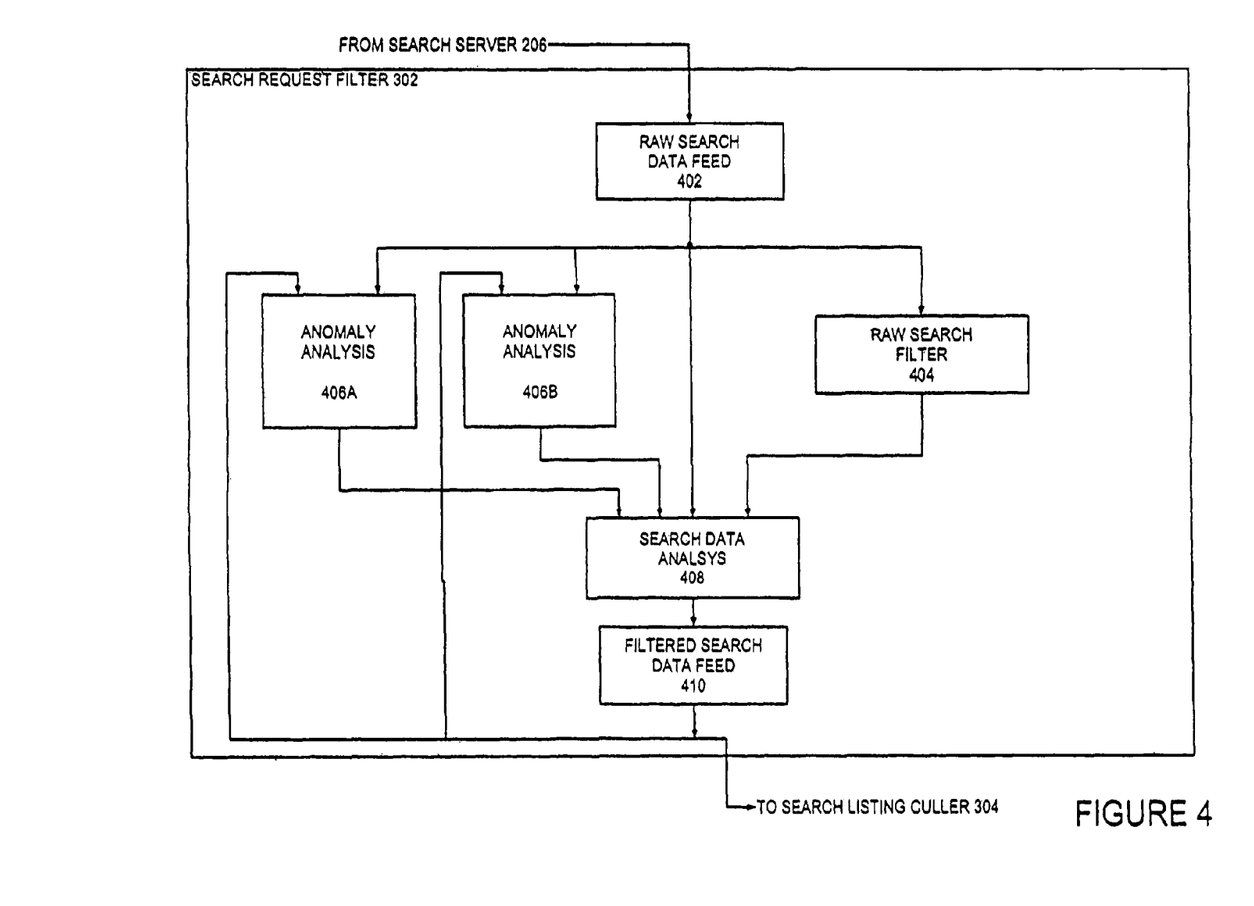
FIG. 4 is a block diagram showing a search request filter of the search search activity analysis module of FIG. 3 in greater detail.
Figure 6:
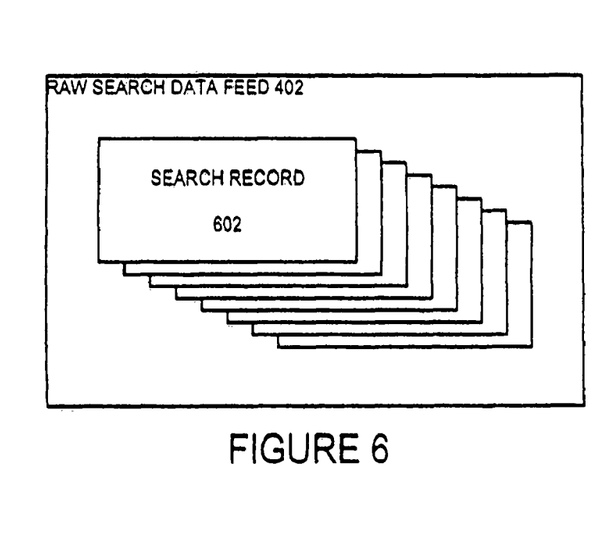
FIG. 6 is a block diagram of raw search data analyzed by the search request filter of FIG. 4.

Search request filter 302 is shown in greater detail in FIG. 4. Search request filter 302 includes a raw search data feed 402 which represents search requests received through search server 206 (FIG. 2). Raw search data feed 402 is shown in greater detail in FIGS. 6 and 7 and includes a number of search records 602, each of which represents a search request submitted by a client computer system such as any of client computer systems 108A-C (FIG. 1).

Each search record 602 (FIGS. 6 and 7) includes a number of fields 702-710. Search query field 702 represents a search query of the search request as a collection of one or more search terms. For example, a search query of "experimental aircraft engine" requests information pertaining to three individual search terms, namely, "experimental," "aircraft," and "engine."

Figure 7:
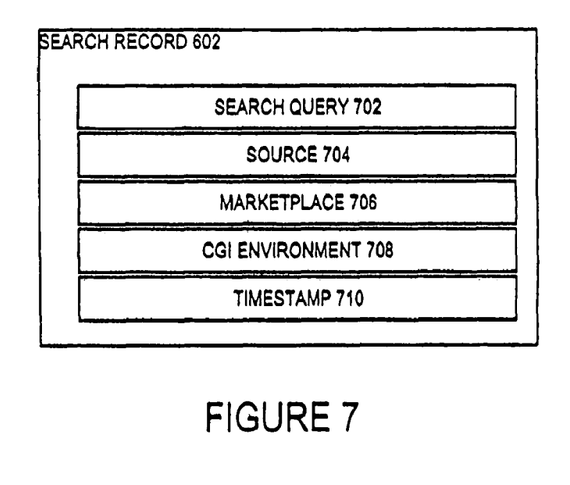
FIG. 7 is a block diagram of a search record of the raw search data of FIG. 6 in greater detail.

Source field 704 specifies a source of the search request. In this illustrative embodiment, search engine 102 performs searches on behalf of other search engines and such other search engines are referred to as sources, and source field 704 identifies the particular source for which the search represented by search record 602 is performed. In an alternative embodiment, search engine 102 receives search requests directly from client computer systems only and source field 704 is omitted.

Marketplace field 706 represents a marketplace for which the search request is submitted. As used herein, a marketplace refers to a geographic region in which each search listing is individually made available. In this illustrative embodiment, search engine 102 allows owners of search listings to specify one or more marketplaces in which the search listings are to be made available as results of search queries. Accordingly, to the extent search activity in specific marketplaces is desired, such marketplace information should be associated with search records. Similarly, any other information of interest of search requests can be included in search record 602.

CGI (Common Gateway Interface) environment field 708 represents a number of characteristics of the environment in which the search request is submitted. Of particular interested to search request filter 302 in this illustrative embodiment are the CGI environment variables HTTP_USER_AGENT and REMOTE_ADDR. These variables and their use by search request filter 302 are described more completely below.

Timestamp field 710 represents a date and time at which the search query is submitted.

Raw search data feed 402 (FIG. 4) is received by a raw search filter 404, one or more anomaly analysis modules 406A-B, and a search data analysis module 408. Raw search filter 404 analyzes individual search records of raw search data feed 402 to detect illegitimate searches and marks search records representing illegitimate searches as such. Each of one or more anomaly analysis modules 406A-B compares search data in raw search data feed 402 to expected search data to detect anomalies of search data. Search data analysis module 408 uses anomaly analysis from anomaly analysis modules 406A-B, information from raw search filter 404, and raw search data feed 402 to remove illegitimate searches from raw search data feed 402 to produce filtered search data feed 410.

Figure 8:
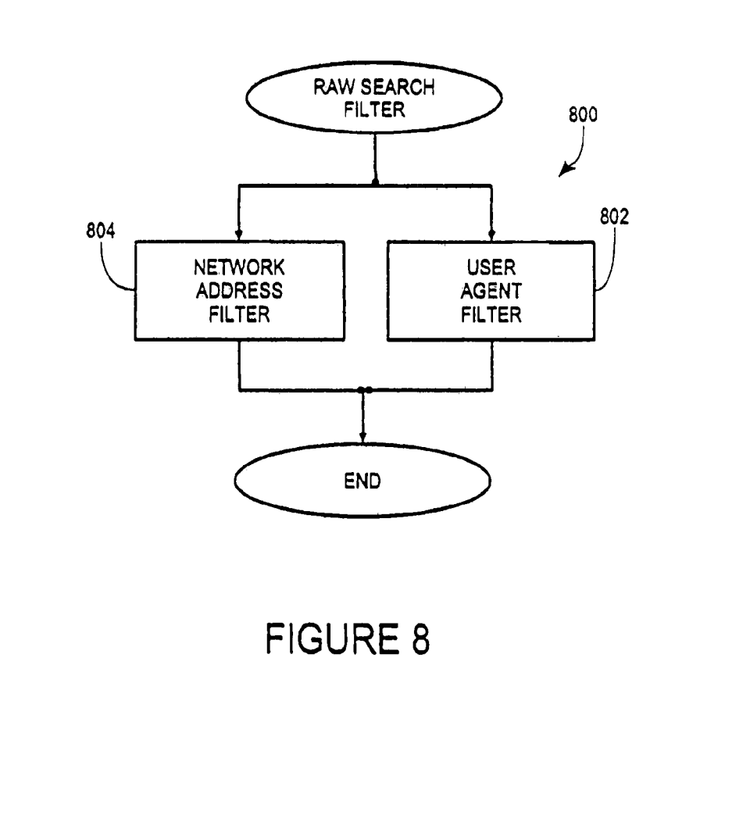
FIG. 8 is a logic flow diagram showing processing of raw search data by the search request filter of FIG. 4 in accordance with the present invention.

Processing by raw search filter 404 is illustrated by logic flow diagram 800 (FIG. 8). Steps 802 and 804 are independent of each other and can be performed in generally any order, even concurrently. In step 802, raw search filter 404 applies a user agent filter to detect illegitimate search requests in raw search data feed 402. In step 804, raw search filter 404 applies a network address filter to detect illegitimate search requests in raw search data feed 402.

Figure 9:
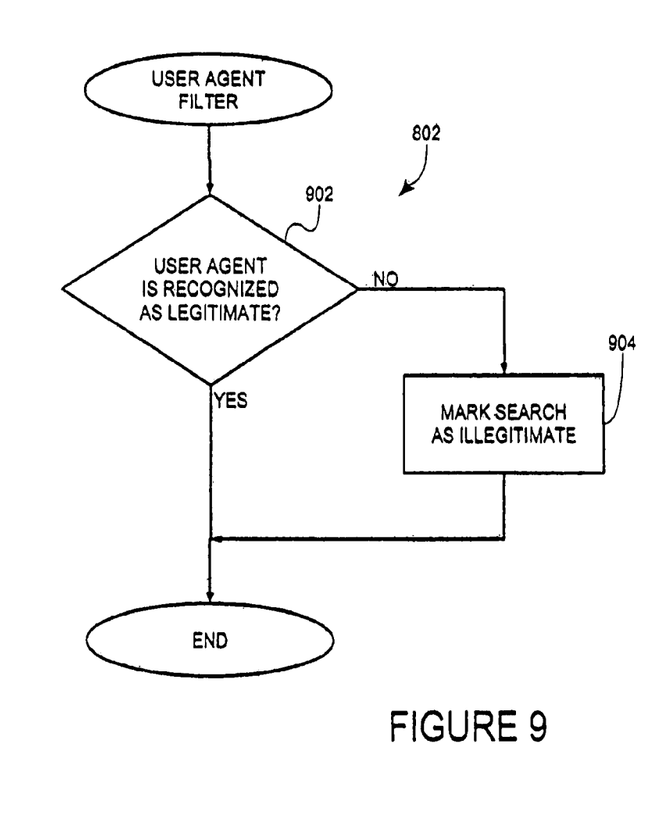
FIG. 9 is a logic flow diagram of a portion of the logic flow diagram of FIG. 8 in greater detail.

Step 802 is shown in greater detail as logic flow diagram 802 (FIG. 9). In test step 902, raw search filter 404 determines whether the user agent of the search is recognized as a legitimate user agent. The user agent is represented by the CGI environmental variable, HTTP_USER_AGENT, stored in CGI environment field 708 of each search and identifies the web browser or other computer program through which the user submitted the search query. An example of data representing the HTTP_USER_AGENT CGI environmental variable is "Mozilla/5.0 (X11; U; Linux i686; en-US; rv1.0.1) Gecko/20020918" which identifies version 1.0.1 of the Mozilla web browser executing in the context of the Linux operating system. Raw search filter 404 stores data representing user agent identification of a number of computer programs known to be used by users to submit search queries in honest attempts to locate information through wide area network 104. Typically, such computer programs are web browsers, which are known and are not described herein. The identified computer programs are sometimes referred to herein as recognized user agents. It is preferred that the collection of recognized user agents is as complete as possible to include as many legitimate user agents as possible.

Raw search filter 404 compares user agent identification of each search of raw search data feed 402 to the recognized user agents in test step 902. If the user agent identification of a particular search matches none of the recognized user agents, that search is marked as illegitimate in step 904. Conversely, the search is not marked as illegitimate, by skipping step 904, if the user agent identification of the search matches any of the recognized user agents.

There are a number of scenarios in which search requests can be submitted by unrecognized user agents. For example, a script or program can be configured to periodically submit a number of search requests to search engine 102 to measure response times of search engine 102 and/or to determine placement of one or more search listings in a set of search results. A script or program can also be configured to repeatedly submit a search request having a specific search query and to subsequently emulate user selection of a search listing in an attempt to influence apparent search activity as determined by search activity analysis module 212 (FIG. 3). Such scripts and programs generally do not identify themselves as recognized user agents.

Thus, such search requests—which are not legitimate search requests by a user in an honest attempt to locate information—are marked as illegitimate by raw search filter 404. A search can be marked as illegitimate in any of a number of ways, such as including a valid field (not shown) in search record 602 (FIG. 7) and/or including a unique identifier of search record 602 in a list of illegitimate search queries.

Figure 10:
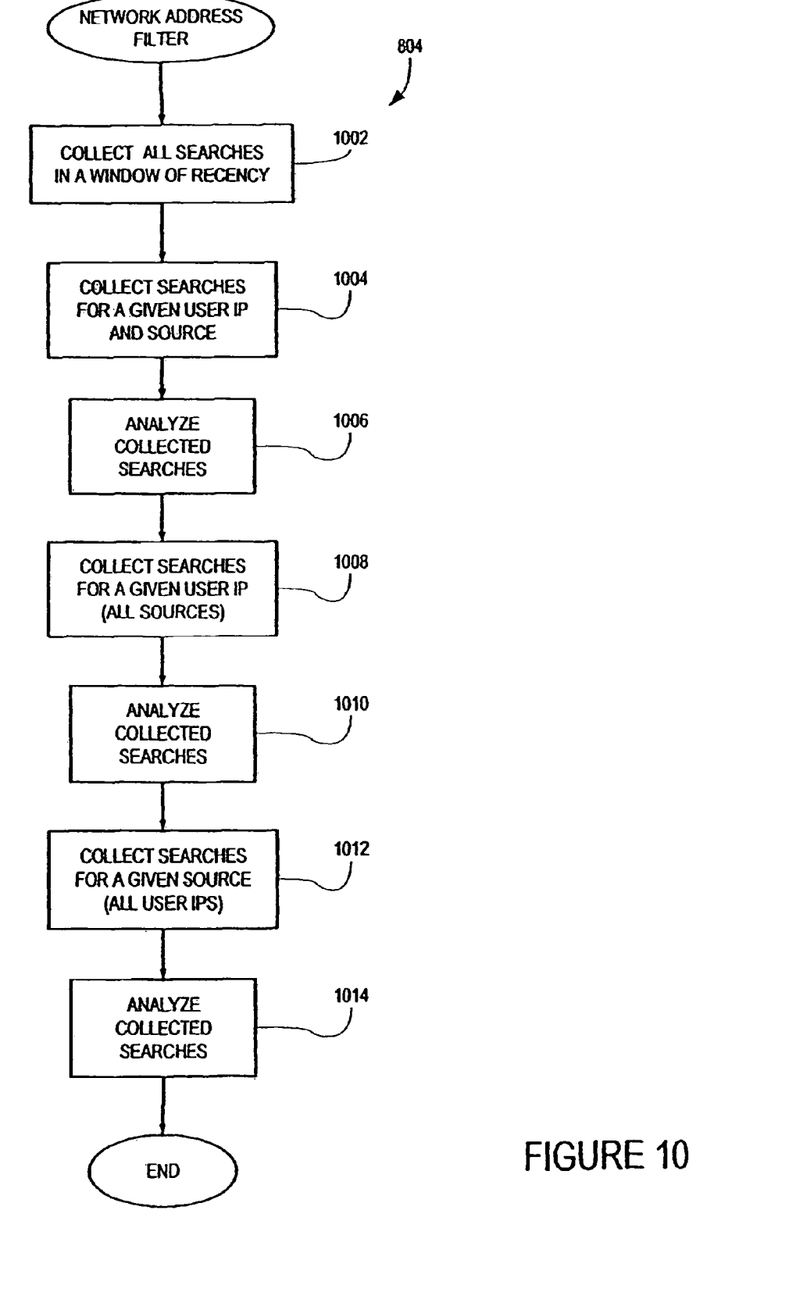
FIG. 10 is a logic flow diagram of a portion of the logic flow diagram of FIG. 8 in greater detail.

Step 804 is shown in greater detail as logic flow diagram 804 (FIG. 10). In step 1002, raw search filter 404 (FIG. 4) collects search records within a window of recency. For example, the window of recency can be a one-hour or a twelve-hour or a twenty-four-hour window of recency such that all search records which represent search queries submitted within the most recent one, twelve, or twenty-four hours, respectively, are processing in the loop of steps 1002-1014.

In step 1004, raw search filter 404 groups all search records of the window of recency according to user-IP/source pairs. In other words, all search records corresponding to the same user IP and the same source are grouped together. The user IP is the IP (Internet Protocol) network address through which the search query represented by the search record is submitted. In search record 602 (FIG. 7), the user IP is represented in CGI environment field 708. Specifically, the user IP is provided by the known CGI environmental variable, REMOTE_ADDR, and represents an IP address through which the search request is submitted. While some users can have their queries routed through a single IP address, most IP addresses identify individual users. Thus, evaluating activity associated with a single IP address is useful in evaluating activity of individual users.

In this illustrative embodiment, search engine 102 serves search queries directly and is therefore the sole source—therefore, all sources are one and the same. In alternative embodiments, search engine 102 also receives search requests forwarded by other search engines and in response sends resulting search listings to such other search engines. Each other such search engine is a source. To the extent search requests of multiple users are routed through a single IP address, separating requests submitted through different sources helps segregate search queries of multiple users.

Figure 11:
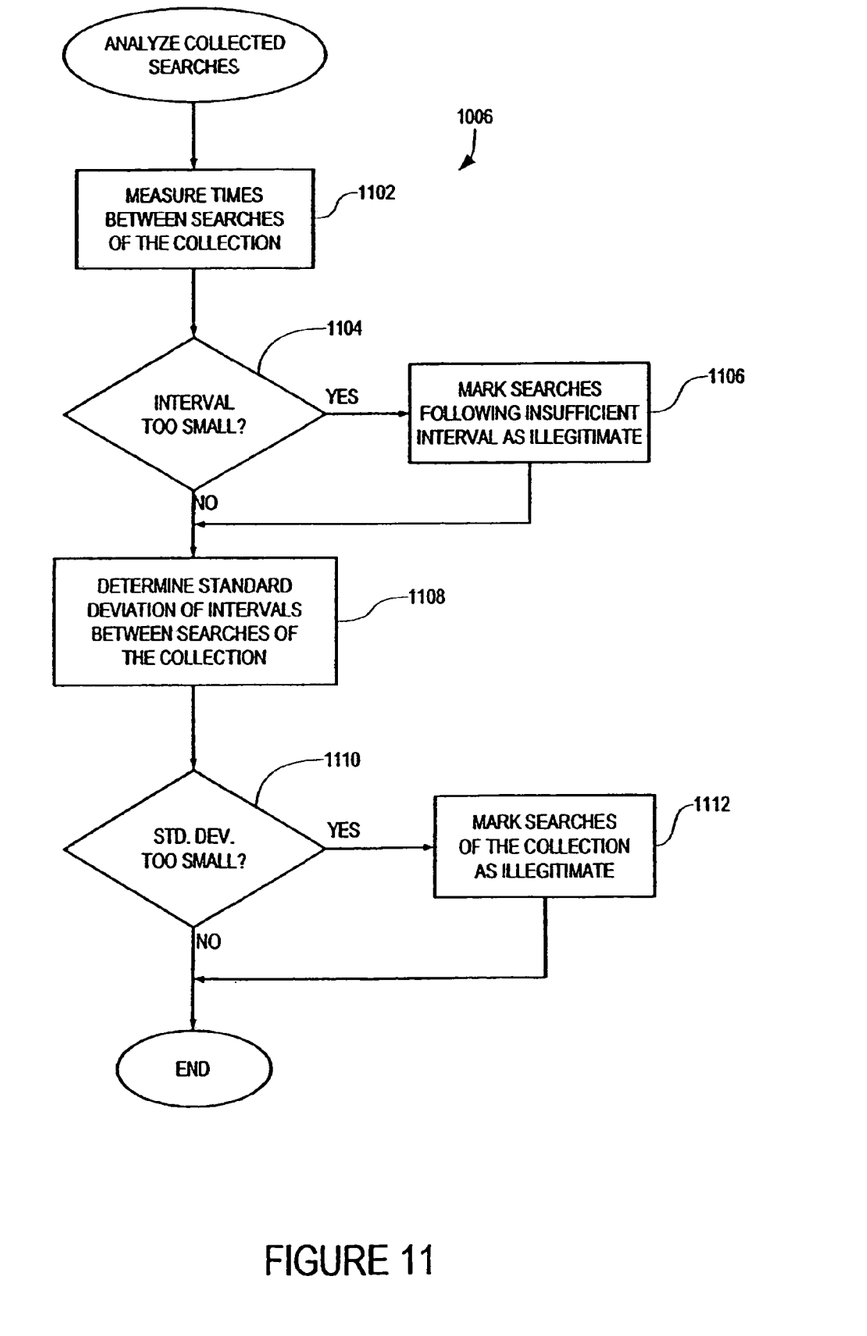
FIG. 11 is a logic flow diagram of a portion of the logic flow diagram of FIG. 10 in greater detail.

In step 1006, raw search filter 404 (FIG. 4) analyzes the search records collected in step 1004 (FIG. 10). Step 1006 is shown in greater detail as logic flow diagram 1006 (FIG. 11). In step 1102, raw search filter 404 (FIG. 4) measures time intervals between searches of the collection formed in step 1004 (FIG. 10). Time intervals are measured as time differences between timestamp fields 710 (FIG. 7) of chronologically adjacent search records.

In test step 1104 (FIG. 11), raw search filter 404 compares each interval to a predetermined minimum threshold. The predetermined minimum threshold is selected to be generally too short to reasonably represent an interval between consecutive search queries by a user. In this illustrative embodiment, it is presumed that a human user will take at least approximately two (2) seconds between submitting consecutive search queries. Accordingly, the predetermined minimum threshold interval associated with test step 1102 is two (2) seconds in this illustrative embodiment.

If any search records follow too closely behind other search records, i.e., immediately follow inter-search intervals less than the predetermined minimum threshold, processing transfers to step 1106 (FIG. 11) in which such search records are marked as illegitimate by raw search filter 404. For search records which do not follow another search record too closely, step 1106 is skipped.

In step 1108, raw search filter 404 determines the statistical standard deviation of intervals between searches of the collection. In test step 1110, raw search filter 404 compares the standard deviation to a predetermined minimum threshold. Generally, in steps 1108-1110, raw search filter 404 measures the regularity of the spacing of search queries to detect automatically generated search queries which are generally far more regular than searches submitted by human users. For example, if a number of searches through the same source and from the same network address are spaced an average of 60 seconds apart with a standard deviation of less than one (1) second, it is rather unlikely that a human user generated those search queries. In this illustrative embodiment, the predetermined minimum threshold associated with test step 1110 is two (2) seconds.

If the measured standard deviation is less than the predetermined minimum threshold, processing transfers to step 1112 in which raw search filter 404 marks all search records of the collection as illegitimate. Conversely, if the measured standard deviation is at least the predetermined minimum threshold, raw search filter 404 skips step 1112.

After steps 1110-1112, processing according to logic flow diagram 1006, and therefore step 1006 (FIG. 10), completes. Thus, in step 1006, raw search filter 404 marks search records as illegitimate if the search records follow one another too closely in time or are too regularly spaced to reasonably represent bona fide search queries submitted by human users.

In step 1008, raw search filter 404 groups search records of the window of recency according to user IP and independently of source. In step 1010, raw search filter 404 analyzes the grouped search records in the manner described above with respect to step 1006. Steps 1008-1010 allow raw search filter 404 to detect illegitimate searches spread over multiple sources. If only a single source is used, i.e., search engine 102 does not serve search queries forwarded by other search engines, steps 1008-1010 are redundant in view of steps 1004-1006 and are therefore omitted.

In step 1012, raw search filter 404 groups search records of the window of recency according to source and independently of user IP. In step 1014, raw search filter 404 analyzes the grouped search records in the manner described above with respect to steps 1006 and 1010. Steps 1012-1014 allow raw search filter 404 to detect illegitimate searches spread over multiple user IPs.

After step 1014, processing according to logic flow diagram 804, and therefore step 804 (FIG. 8), completes. Thus, raw search filter 404 (FIG. 4) analyzes raw search data feed 402 for patterns which show illegitimate search queries which could improperly influence performance evaluation of search listings. Anomaly analysis modules 406A-B detect anomalies in search query behavior to detect unusually unlikely changes in user searching activity.

Figure 5:
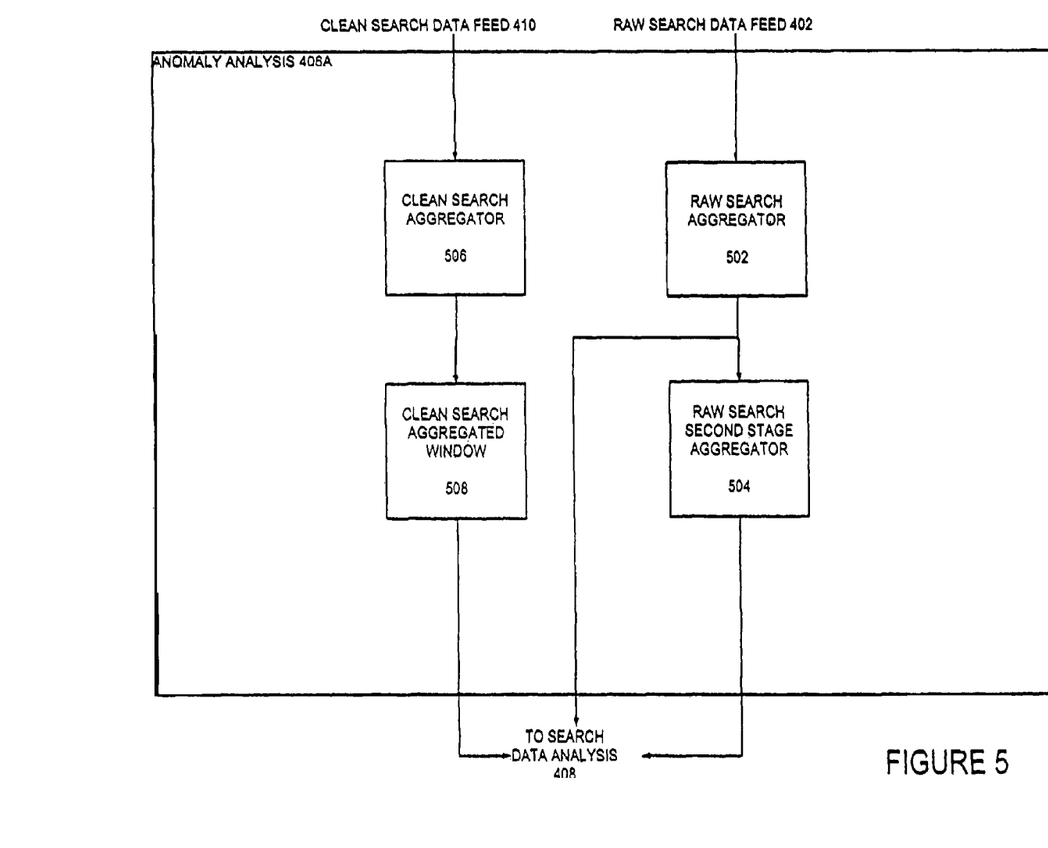
FIG. 5 is a block diagram showing an anomaly analysis module of the search request filter of FIG. 4 in greater detail.

Anomaly analysis module 406A is shown in greater detail in FIG. 5. In this illustrative embodiment, only one anomaly analysis module is used, i.e., anomaly analysis module 406B either doesn't exist or is included as shown and is a null operation, doing nothing. However, since search data analysis module 408 is capable of processing anomaly analysis results from multiple anomaly analysis modules, alternative embodiments include anomaly analysis modules other than anomaly analysis module 406A.

Anomaly analysis module 406A includes a raw search aggregator 502 which aggregates search data from raw search data feed 402 (FIG. 4) into 15-minute aggregated search records. For example, aggregated search record 1204 (FIG. 13) includes a count field 1302, a term field 1304, a source field 1306, and a marketplace field 1308. Aggregated search record 1204 represents a number of individual search queries having the same search term, source, and marketplace. Count field 1302 specifies the number of search records represented by aggregated search record 1204. Term field 1304 specifies the search term of those search records represented by aggregated search record 1204. Source field 1306 specifies the source of those search records represented by aggregated search record 1204. Marketplace field 1308 specifies the marketplace of those search records represented by aggregated search record 1204.

Figure 12:
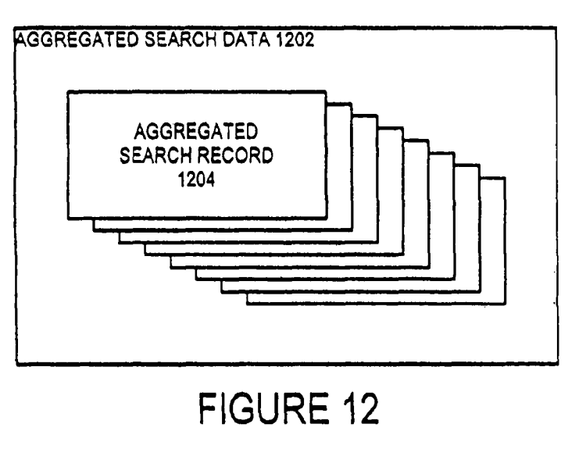
FIG. 12 is a block diagram of aggregated search data analyzed by the search request filter of FIG. 4.

Raw search aggregator 502 aggregates search records to form aggregated search records for all combinations of search term, source, and marketplace and such aggregated search records collectively form aggregated search data 1202 (FIG. 12). The 15-minute aggregated search data is made available to both raw search second stage aggregator 504 (FIG. 5) and to search data analysis module 408 (FIG. 4). Raw search second stage aggregator 504 (FIG. 5) aggregates the 96 most recent 15-minute aggregated search data, e.g., aggregated search data 1202 (FIG. 12), to form 24-hour aggregated search data organized in a manner which is directly analogous to that described above with respect to FIGS. 12-13. The 24-hour aggregated search data is also made available to search data analysis 408.

For purposes of comparison to detect unexpected changes in search behavior, anomaly analysis module 406A also includes a clean search aggregator 506 to form a clean search aggregated window 508. Clean search aggregator 506 receives clean search data feed 410 (FIG. 4), from which illegitimate searches have been removed, and aggregates search records of clean search data feed 410 in a manner analogous to that described above with respect to raw search aggregator 502 (FIG. 5) to form clean search aggregated window 508. In this illustrative embodiment, clean search aggregated window 508 is aggregated over the most recent 24-hour period to avoid search traffic patterns which may fluctuate according to the time of day.

Search data analysis module 408 (FIG. 4) receives (i) raw search data feed 402, (ii) identification of individual illegitimate search queries from raw search filter 404, and (iii) 15-minute and 24-hour aggregated search data and 24-hour aggregated clean search data from anomaly analysis module 406A. In embodiments in which additional anomaly analysis modules are included, search data analysis module 408 receives data from those additional anomaly analysis modules as well. Search data analysis module 408 uses all this information to remove illegitimate search queries from raw search data feed 402 to produce filtered search data feed 410. Filtered search data feed 410 is used by anomaly analysis module 406A in the manner described above and represents actual searching activity by human users much more accurately than does raw search data feed 402.

Figure 13:
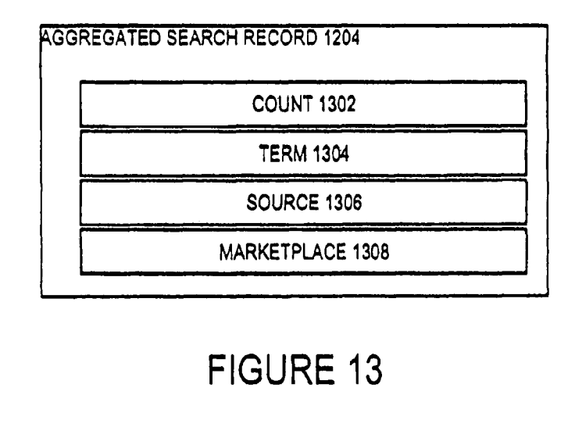
FIG. 13 is a block diagram of an aggregated search record of the raw search data of FIG. 12 in greater detail.
Figure 14:
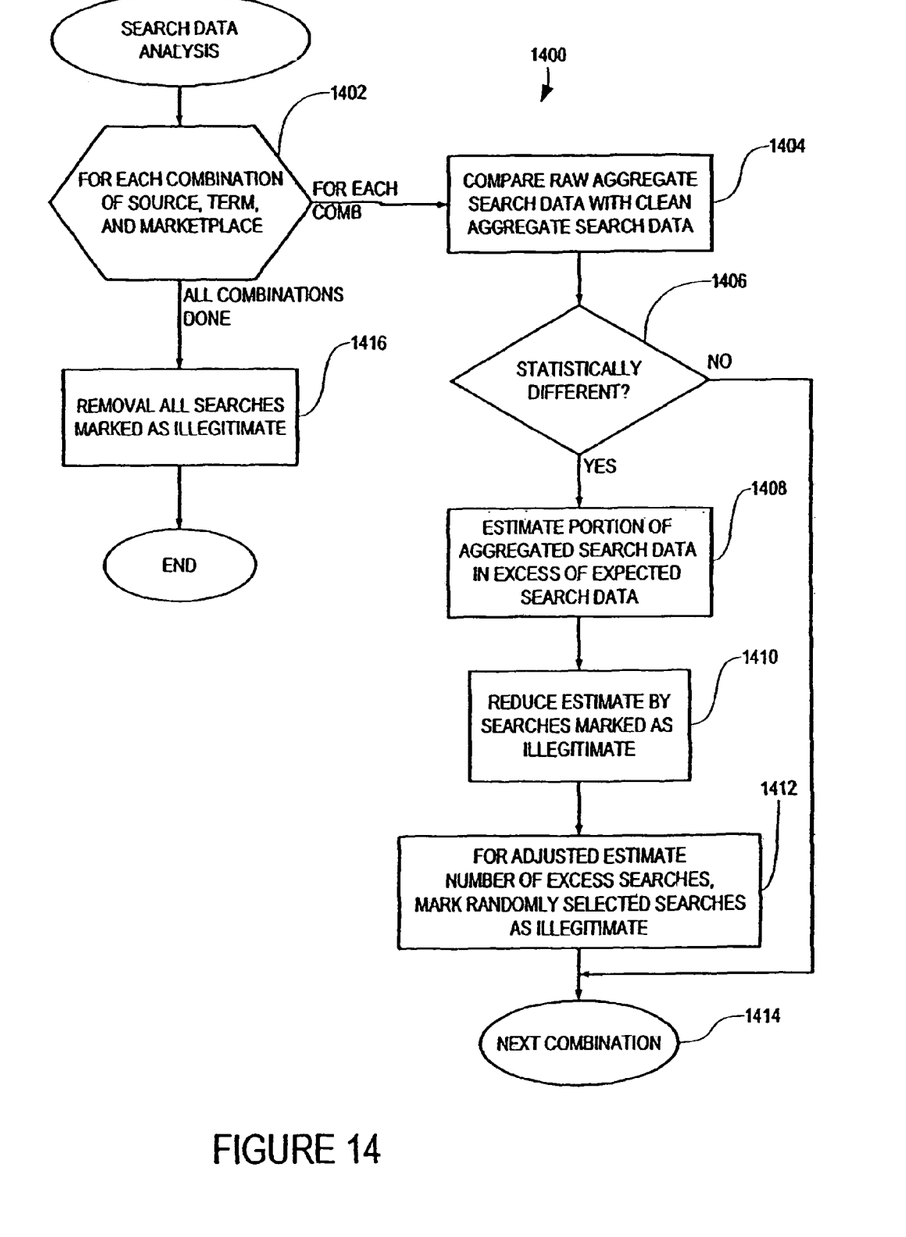
FIG. 14 is a logic flow diagram showing processing of filtered raw search data and aggregated search data by the search request filter of FIG. 4 in accordance with the present invention.

Processing by search analysis module 408 (FIG. 4) is illustrated by logic flow diagram 1400 (FIG. 14). Loop step 1402 and next step 1414 define a loop in which each combination of search term, source, and marketplace, e.g., each aggregated search record 1204 (FIGS. 12-13), is processed according to steps 1404-1412 (FIG. 14). Within the loop of steps 1402-1414, the particular search term, source, and marketplace of the particular aggregated search record are sometimes respectively referred to as the subject term, the subject source, and the subject marketplace. While search data analysis module 408 performs steps 1404-1412 for all aggregated search records, steps 1404-1412 are described herein in the context of processing aggregated search record 1204 (FIG. 13).

In step 1404, search data analysis module 408 compares aggregated raw search data received from raw search aggregator 502 (FIG. 5) and raw search second stage aggregator 504 to clean search aggregated window 508. In test step 1406, search data analysis module 408 determines whether the 15-minute or the 24-hour aggregated raw search data is statistically different from clean search aggregated window 508.

Search data analysis module 408 determines whether the aggregated raw search data is statistically different by first calculating an expected maximum for the aggregated raw search data. In this illustrative embodiment, the expected maximum is calculated according to the following equation.

$$EV = \frac{EV_s w_s + EV_{s/t} w_{s/t} + EV_{t/s} w_{t/s}}{w_s + w_{s/t} + w_{t/s}} \quad (1)$$

In equation (1), the expected maximum volume, EV, is a weighted average of $EV_s$, $EV_{s/t}$, and $Ev_{t/s}$. $EV_s$ is a calculated expected volume based on a proportion of search volume attributable to the subject source. $EV_{s/t}$ is a calculated expected volume based on a proportion of search volume attributable to the subject source relative to the subject term. $EV_{t/s}$ is a calculated expected volume based on a proportion of search volume attributable to the subject term relative to the subject source. The weights $w_s$, $w_{s/t}$, and $w_{t/s}$ correspond to $EV_s$, $EV_{s/t}$, and $Ev_{t/s}$, respectively. In this illustrative embodiment, the weights $w_s$, $w_{s/t}$, and $w_{t/s}$ are all set to one (1.0) such that each expected volume is weighted equally with respect to the others.

The expected volume $EV_s$ is calculated by search data analysis module 408 according to the following equation.

$$EV_s = CV_{tm}\left(\frac{CV_{sm}}{CV_m}\right)k_s \quad (2)$$

In equation (2), $CV_{tm}$ represents the volume of searches for the subject term and the subject marketplace from all sources within clean search aggregated window 508 for the same period of time of the compared aggregated raw search data. Specifically, in comparing a 15-minute window of aggregate raw search data from raw search aggregator 502, a 15-minute window of clean search aggregated window 508 is represented by $CV_{tm}$. Similarly, in comparing a 24-hour window of aggregate raw search data from raw search second stage aggregator 504, a 24-hour window of clean search aggregated window 508 is represented by $CV_{tm}$.

$CV_{sm}$ represents the volume of searches for the subject source and the subject marketplace within clean search aggregated window 508 for the most recent 24-hour period. $CV_m$ represents the volume of searches for the subject marketplace, including all search terms and all sources, within clean search aggregated window 508 for the most recent 24-hour period. Thus, the ratio, $$\frac{CV_{sm}}{CV_m},$$

represents the proportion of all searches in the subject marketplace which come from the subject source in the most recent 24 hours. While search volume for individual search terms might fluctuate unpredictably from one hour to the next, the proportion of searches coming from a specific source tends to remain comparably stable. Thus, multiplying the search volume for the subject term by such a ratio provides a reasonably reliable expectation of the true volume of legitimate searches for the subject term from the subject source.

This reasonably reliable expectation is multiplied by a tuning factor, $k_s$, to allow for changes from day to day in the portion of search volume received from the subject source without being perceived as an illegitimate increase in search volume. In this illustrative embodiment, $k_s$ is 1.1, allowing a ten percent growth in the proportion of search volume of the subject source from one day to the next.

The expected volume $EV_{s/t}$ is calculated by search data analysis module 408 according to the following equation.

$$EV_{s/t} = Observed_{tm}\left(\frac{CV_{tsm}}{CV_{tm}}\right)k_{s/t} \quad (3)$$

In equation (3), $Observed_{tm}$ represents all aggregated raw search records for the subject term and the subject marketplace from all sources. In this illustrative embodiment, only aggregated raw search records of the same time-duration (either 15-minute or 24-hour in this embodiment) are aggregated to form $Observed_{tm}$.

$CV_{tm}$ is as described above with respect to equation (2) but covering the entire 24-hour window of clean search data. $CV_{tsm}$ represents the volume of searches for the subject term, the subject source, and the subject marketplace within clean search aggregated window 508 for the most recent 24-hour period. Thus, the ratio, $$\frac{CV_{tsm}}{CV_{tm}},$$

represents the proportion of searches coming from the subject source relative to all sources for the subject term and the subject marketplace. Such a ratio tends to remain stable despite fluctuations in popularity of the subject term. Thus, multiplying the observed search volume for the subject term from all sources by such a ratio provides a reasonably reliable expectation of the true volume of legitimate searches for the subject term from the subject source.

This reasonably reliable expectation is multiplied by a tuning factor, $k_{s/t}$, to allow for changes from day to day in the portion of search volume received from the subject source without being perceived as an illegitimate flood of searches. In this illustrative embodiment, $k_{s/t}$ is 1.1, allowing a ten percent growth in the proportion of search volume of the subject source for the subject term from one day to the next.

The expected volume $EV_{t/s}$ is calculated by search data analysis module 408 according to the following equation.

$$EV_{t/s} = Observed_{sm}\left(\frac{CV_{tsm}}{CV_{sm}}\right)k_{t/s} \quad (4)$$

In equation (3), $Observed_{sm}$ represents all aggregated raw search records for all search terms from the subject source for the subject marketplace. In this illustrative embodiment, only aggregated raw search records of the same time-duration (either 15-minute or 24-hour in this embodiment) are aggregated to form $Observed_{sm}$.

$CV_{sm}$ represents the portion of clean search aggregated window 508 pertaining to the subject source and the subject marketplace and thus represents the volume of legitimate searches for all terms from the subject source for the subject marketplace. $CV_{tsm}$ is as described above with respect to equation (3). Thus, the ratio, $$\frac{CV_{tsm}}{CV_{sm}},$$

represents the proportion of searches for the subject term relative to all search terms in the subject marketplace from the subject source in the most recent 24 hours. Multiplying the observed search volume for all search terms from the subject source by such a ratio estimates an expectation of the true volume of legitimate searches for the subject term from the subject source in the subject marketplace.

This reasonable expectation is multiplied by a tuning factor, $k_{t/s}$, to allow for changes from day to day in the portion of search volume received from the subject source without being perceived as an illegitimate flood of searches. In this illustrative embodiment, $k_{t/s}$ is 1.1, allowing a ten percent growth in the proportion of search volume of the subject term relative to all search terms of the subject source from one day to the next.

The weighted average of equation (1) above avoids reliance on any particular single calculated expectation and the weights and tuning factors described above can be adjusted to more accurately represent maximum expected legitimate search traffic as experience with search volume is accumulated.

If aggregated search record 1204 is not statistically different from expected search activity, i.e., is no greater than the maximum expected search volume determined according to equation (1), processing transfers to next step 1414 (FIG. 14) and the next aggregated search record is processed by search data analysis module 408 according to the loop of steps 1402-1414. Conversely, if aggregated search record 1204 (FIG. 13) is statistically different from expected search activity, i.e., is greater than the maximum expected search volume determined according to equation (1), processing transfers to step 1408.

In step 1408, search data analysis module 408 estimates the portion of aggregated search record 1204 which is attributable to illegitimate search queries. In this illustrative embodiment, the estimated portion is the numerical difference by which count 1302 exceeds the maximum expected search volume determined according to equation (1).

In step 1410, search data analysis module 408 reduces the estimated portion from step 1408 by the number of individual searches marked as illegitimate by raw search filter 404. In step 1412, search data analysis module 408 randomly selects and marks as illegitimate a number of search records of raw search data feed 402 where the number is equal to the number of illegitimate searches as estimated in step 1408 and adjusted in step 1410. If the adjusted estimated portion is non-positive, step 1412 is skipped. In addition, search data analysis module 408 only randomly selects search records which are not already marked as illegitimate by raw search filter 404.

The following example is illustrative. Consider that clean search aggregated window 508 and equation (1) above suggest that 2,000 searches are expected for a given term, from a given source, and within a given marketplace. Consider further than 3,000 searches are aggregated for that term, source, and marketplace combination and that the difference is determined in test step 1406 to be statistically significant. Thus, 1,000 searches are estimated to be illegitimate. Suppose that raw search filter 404 has identified 600 individual searches as illegitimate. Thus, 400 searches are estimated to be illegitimate but unidentified. In step 1412, search data analysis module 408 randomly selects 400 searches from the 2,400 searches which are not yet identified as illegitimate by raw search filter 404 and marks those 400 randomly selected searches as illegitimate.

After step 1412, processing transfers through next step 1414 (FIG. 14) and the next aggregated search record is processed by search data analysis module 408 according to the loop of steps 1402-1414. Once all combinations of term, source, and marketplace have been processed according to the loop of steps 1402-1414, processing transfers to step 1416 in which all search records marked as illegitimate are removed from raw search data feed 402 to produce filtered search data feed 410.

Thus, individually identified illegitimate searches are removed from raw search data feed 402 as are a number of randomly selected other searches when an anomaly in searching activity is detected. Accordingly, filtered search data feed 410 more accurately reflects actual activity of users submitting bona fide search queries.

As described above, filtered search data feed 410 is used by anomaly analysis module 406A to determine expected levels of searching activity and is used by search listing culler 304 to evaluate performance of individual search listings in the manner described in the search activity analysis module Application. As a result, performance evaluation of individual search listings is not unduly influenced by illegitimate searches.

The above description is illustrative only and is not limiting. The present invention is defined solely by the claims which follow and their full range of equivalents.

What is claimed is:

1. A method for improving the accuracy by which a database of search queries represent human search behavior, the method comprising:
    determining, by a computer, an expected quantity of search queries;
    comparing a quantity of the search queries to the expected quantity of search queries;
    determining that the quantity of search queries exceeds the expected quantity of search queries by at least a predetermined margin;
    selecting a number of search queries of the quantity in accordance with an amount by which the quantity exceeds the expected quantity; and
    removing the selected number of search queries from the quantity, where the search query includes a search term and a source,
    where the determining the expected quantity of search queries includes determining an expected quantity of search queries based on a proportion of search volume attributable to the search term relative to the source, where the expected quantity of search queries based on a proportion of search volume attributable to the search term relative to the source is determined for a particular geographic region.

2. The method of claim 1, where the source is an Internet search engine.

3. The method of claim 1, where the determining the expected quantity of search queries includes determining an expected quantity of search queries based on a proportion of search volume attributable to the source.

4. The method of claim 3, where the expected quantity of search queries based on a proportion of search volume attributable to the source is determined for a particular geographic region.

5. The method of claim 1, where the determining the expected quantity of search queries includes determining an expected quantity of search queries based on a proportion of search volume attributable to the source relative to the search term.

6. The method of claim 5, where the expected quantity of search queries based on a proportion of search volume attributable to the source relative to the search term is determined for a particular geographic region.

7. A method for improving the accuracy by which a database of search queries represent human search behavior, the method comprising:
   determining, by a computer, an expected quantity of search queries;
   comparing a quantity of the search queries to the expected quantity of search queries;
   determining that the quantity of search queries exceeds the expected quantity of search queries by at least a predetermined margin;
   selecting a number of search queries of the quantity in accordance with an amount by which the quantity exceeds the expected quantity; and
   removing the selected number of search queries from the quantity, where the search query includes a search term and a source,
   where the determining the expected quantity of search queries includes determining an expected quantity of search queries based on a proportion of search volume attributable to the search term relative to the source, determining an expected quantity of search queries based on a proportion of search volume attributable to the source relative to the search term, and determining an expected quantity of search queries based on a proportion of search volume attributable to the source.

8. The method of claim 7, where the expected quantity of search queries based on a proportion of search volume attributable to the search term relative to the source is determined for a particular geographic region.

9. The method of claim 8, where the expected quantity of search queries based on a proportion of search volume attributable to the source is determined for a particular geographic region.

10. The method of claim 9, where the expected quantity of search queries based on a proportion of search volume attributable to the source relative to the search term is determined for a particular geographic region.

\* \* \* \* \*